UNITED STATES PATENT OFFICE.

FRIEDRICH AUGUST VOLKMAR KLOPFER, OF DRESDEN-LEUBNITZ, GERMANY.

MANUFACTURE OF MILLED SOAP.

1,085,437. Specification of Letters Patent. Patented Jan. 27, 1914.

No Drawing. Application filed February 6, 1912. Serial No. 675,811.

*To all whom it may concern:*

Be it known that I, FRIEDRICH AUGUST VOLKMAR KLOPFER, a subject of the Emperor of Germany, residing at Dresden-Leubnitz, in the Empire of Germany, have invented new and useful Improvements in the Manufacture of Milled Soap, of which the following is a specification.

In order to neutralize the free alkali in soap and also to prevent the crumbling and flaking of milled soaps, it has already been suggested to incorporate with the soap gliadin, glutenin and like albuminous constituents of wheat.

The incorporation of vegetable albumin into soap to be milled presents considerable technical difficulties and this is the case both when moist fresh albumin as well as when the powdered product is employed. That is to say, the albumin has remained distributed throughout the mass in the form of separate undissolved grains which when the soap is dissolved in water, settle gradually to the bottom of the liquid.

According to the present invention, in order to enable the mixture of vegetable albumin and soap to form a coherent, homogeneous and plastic mass, which will retain its plasticity when stored, the vegetable albumin is previously treated with glycerin at an elevated temperature, for example, the albumin in the form of powder is stirred with glycerin at a temperature of 31° C., which is gradually raised to from 110° to 120° C. the stirring being continued. As the temperature is raised, the powder loses its sandy, pulverulent structure and forms a uniform, almost transparent, gelatinous mass, having a marked toughness and plasticity. This product may be perhaps best termed an albumin-paste. The action is somewhat similar to the formation of homogeneous starch-paste by boiling starch with water. When this albumin-paste is incorporated into soap no visible separation of particles of albumin takes place, since it can be distributed with perfect homogeneity and continuity throughout the soap, so that the mixture forms a uniform whole. If this soapy mass be treated with a large quantity of water so that the soap is dissolved out of the mixture, the albumin naturally remains insoluble but is precipitated in another physical form to that above mentioned, *i. e.*, it does not go into suspension as individual particles but forms tough masses having a certain amount of plasticity. It thus forms a kind of framework which extends throughout the whole mass of soap, to which it imparts its advantageous physical properties in proportion to its concentration, so that the whole of the albumin is effectively bound in the soap.

The following may be given as an example of carrying the invention into practice:—10 kilograms of dry gliadin and glutenin of wheat in the proportion of 75% of the former to 25% of the latter, are mixed with 20 kilograms of glycerin of a specific gravity of 30° Bé. in a kneading machine provided with means for raising its temperature; the mixture is then kneaded for a considerable time, the temperature being meanwhile gradually raised to about 120° C. From the mere mixture of albumin and glycerin there results in the course of the heating a tough, india-rubber-like, elastic mass, which is transparent when in a thin layer. The sandy form, in which the albumin originally existed, disappears and the whole forms a thoroughly homogeneous mass. This product is then treated in the usual grinding machine with 70 kilograms of ground soap shavings until a perfectly uniform mass results.

What I claim is:—

1. The manufacture of milled soap containing vegetable albumin, consisting in gradually heating the said albumin in a dry pulverized condition with glycerin until the albumin forms a uniform gelatinous mass, and then mixing such gelatinous mass with the soap until a uniform mass results.

2. The manufacture of milled soap containing vegetable albumin, consisting in mixing dried gliadin and glutenin of wheat with glycerin and at the same time gradually raising the temperature until a uniform gelatinous mass is formed, whereupon the product is milled with soap shavings until a perfectly uniform mass results.

3. The manufacture of milled soap containing vegetable albumin, consisting in mixing 10 parts of gliadin and glutenin of wheat with 20 parts of glycerin of a specific gravity of substantially 30° Bé. and at at the same time gradually raising the temperature to about 120° C. until a uniform gelatinous mass is formed, and then mixing the product with 70 parts of soap substantially as described.

FRIEDRICH AUGUST VOLKMAR KLOPFER.

Witnesses:
PAUL ARRAS,
ERNA FAEOLD.

Copies of this patent may be obtained for five cents each, by addressing the "Commissioner of Patents, Washington, D. C."